United States Patent [19]
Sakai

[11] 3,782,216
[45] Jan. 1, 1974

[54] SPEED CHANGE CONTROL SYSTEM FOR AUTOMATIC TRANSMISSION

[75] Inventor: Ichio Sakai, Aichi-ken, Japan

[73] Assignee: Toyota Jidosha Kogyo Kabushiki Kaisha, Aichi-ken, Japan

[22] Filed: Apr. 10, 1972

[21] Appl. No.: 242,406

[30] Foreign Application Priority Data
Apr. 28, 1971 Japan.............................. 46/27550

[52] U.S. Cl.................. 74/364, 74/869, 192/87.15
[51] Int. Cl... F16h 3/08, B60k 21/06, F16d 25/063
[58] Field of Search...................... 192/87.15, 87.18, 192/87.19, 87.11, 87.13; 74/869, 364

[56] References Cited
UNITED STATES PATENTS

| | | | |
|---|---|---|---|
| 2,505,450 | 4/1950 | Wemp.......................... | 192/87.15 X |
| 2,825,236 | 3/1958 | Nabstedt et al............... | 192/87.15 X |
| 2,929,478 | 3/1960 | Tuck et al.................... | 192/87.13 X |
| 2,936,865 | 5/1960 | Tuck et al.................... | 192/87.15 X |
| 3,541,791 | 11/1970 | Lvovsky et al............... | 192/87.15 X |
| 3,707,890 | 1/1973 | Ito........................................ | 74/868 |
| 3,709,067 | 1/1973 | Ito........................................ | 74/869 |
| 3,572,179 | 3/1971 | Akima et al. ......................... | 74/869 |

Primary Examiner—Charles J. Myhre
Assistant Examiner—Thomas C. Perry
Attorney—David Toren et al.

[57] ABSTRACT

In a speed change control system for automatic transmissions, clutch assemblies are provided for second speed and third speed, respectively, and they are arranged in back-to-back relationship in a power transmission arrangement for changing the transmission gear ratio. The clutch assemblies share some components in common. In addition the system includes a control circuit for engaging or disengaging the clutches by oil pressure, a 2-3 shift valve provided in the control circuit for stopping oil feed into the clutch assembly for second speed while feeding oil into the clutch assembly for third speed when shifting from second speed to third speed, an oil exhaust port provided in a servo oil chamber in the clutch assembly for second speed, and a drum element provided in the clutch assembly for third speed. The drum element is displaced by the pressing force of an assembly of plates and discs for opening the oil exhaust port when the clutch assembly for third speed is engaged, so that the actuation of the clutch assembly for second speed, which is disengaged when second to third speed shifting is effected, is synchronized with the pressing action of the assembly of plates and discs in the clutch assembly for third speed which is engaged when the shifting is effected.

5 Claims, 4 Drawing Figures

SPEED CHANGE CONTROL SYSTEM FOR AUTOMATIC TRANSMISSION

SUMMARY OF THE INVENTION

This invention relates to a speed change control system for automatic transmissions suitable for motor vehicles, and more particularly, it relates to a system in which the engagement of the clutch for higher speed and the disengagement of the clutch for lower speed are effected in a good timing relationship when shifting from a lower speed to a higher speed.

In general, the engagement and disengagement of the clutches have the following time relationship; when oil is discharged from a servo oil chamber, into which oil had been fed, a sharp reduction of oil pressure takes place in the chamber to bring the clutch into the disengaged or released position in a very short time. However, when oil is fed into a servo oil chamber which had been in an oil-discharging condition, oil pressure is first built up in the chamber by the incoming oil supplied through a passage and the build up of oil pressure urges a corresponding piston movement to press combined plates and discs for forcing the clutch into its engaged position, as a result a lot more time is required for effecting clutch engagement than for effecting disengagement. Further, gear shifting of the transmission is accomplished by engagement of one clutch, so that when shifting is made from a lower speed to a higher speed, or from a higher speed to a lower speed, one of the clutches must be released while the other clutch is engaged.

If oil feed and discharge are conducted simultaneously for both servo oil chambers during such shifting operation, there is produced a time gap between the clutch engaging and disengaging actions, making it impossible to establish a proper timed relationship between both actions. When shifting from a higher to a lower speed, the time delay in the action of the clutch to be engaged does not matter much since there is sufficient time for the engine to increase its rotational frequency, however, when shifting from a lower speed to a higher speed, for example, from second speed to third speed, the rotational frequency of the engine must be lowered to the normal level for third speed since engine rotation has usually been accelerated to the maximum or close-to-maximum rotational frequency in the second speed range. In this case, if the clutch, which has been in second speed engagement, is released quicker in time than the clutch to be engaged for third speed, idling of the engine can take place and cause overrunning. Further, the clutch for third speed is subjected to a heavy load since the elevated engine speed is reduced, thus giving rise to a high transmitting shock.

Accordingly, the primary object of the present invention is to provide an improved transmission control system so that, when a speed change gear shift is effected, particularly, from a lower speed to a higher speed range, engagement and disengagement of two clutches by feeding and discharging of oil into and from respective servo oil chambers is accomplished in optimum timed relation.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF A PREFERRED EMBODIMENT

Figure 1:
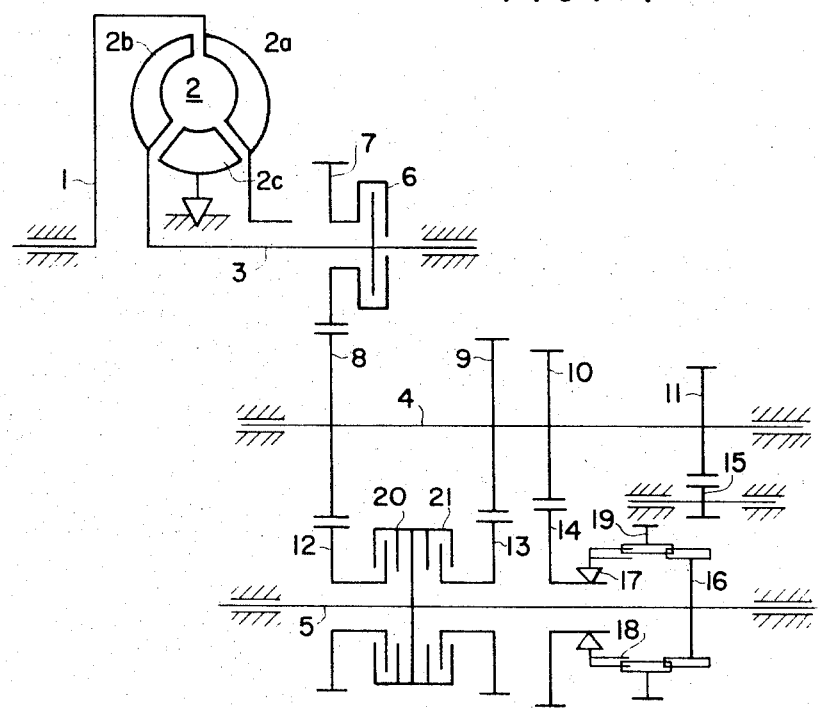
FIG. 1 is a schematic diagram of one example of an automatic transmission in which a control system according to the present invention can be used.

In FIG. 1 a schematic showing is provided of an automatic transmission having a parallel gear system of three speeds forward and one speed reverse, in which the present invention is used. As is illustrated in the figure, a crank shaft 1 leading from an engine (not shown) is mounted coaxially with an input shaft 3 through a torque converter 2, and an intermediate shaft 4 and an output shaft 5 are disposed parallel to the input 3. Torque converter 2 consists of a pump 2a, a turbine 2b and a stator 2c. Pump 2a is connected to crank shaft 1 and turbine 2b to input shaft 3 so that the drive force of crank shaft 1 is transmitted, after torque-conversion in the torque converter, to input shaft 3. A transmission gear 7 is mounted on the input shaft 3 through a clutch 6. Input shaft 3 is connected to the transmission gear 7 when the clutch 6 is engaged as hydraulic oil is supplied into the associated servo oil chamber. Mounted on intermediate shaft 4, as shown from left to right on FIG. 1, is a speed change gear 8 for third speed, a speed change gear 9 for second speed, a speed change gear 10 for first speed and a speed change gear 11 for reverse speed, so that they are meshed with transmission gear 7 successively from the left-most one (gear 8) to transmit the driving rotation from the input shaft. Of this train of gears, speed change gears 8 to 10 are meshed with corresponding speed change gears 12, 13 and 14, respectively, which are rotatably mounted on the output shaft 5. Speed change gear 11 for reverse speed on the intermediate shaft 4 is meshed with an idler gear 15 supported on the gear case side, and an externally splined hub 16 is provided integrally with the output shaft 5. A spline element 18, which is splined on its outer periphery, is connected to speed change gear 15 for first speed through a clutch 17. Disposed between the idler gear 15, the hub 16 and the spline element 18 is a hub sleeve 19 which is internally splined and externally provided with a gear which is movable through the operation of a manual shaft. Additionally, a pair of clutches 20 and 21 are mounted on the output shaft 5 and are combined in back-to-back relationship between speed change gear 12 for third speed and speed change gear 13 for second speed, and some components are shared by both of the clutches for use in common. They are arranged so that speed change gear 12 is connected to output shaft 5 when hydraulic oil is supplied into the servo oil chamber of clutch 20, to bring it into the engaged, and hence operative, position, while speed change gear 13 is connected to output shaft 5 when hydraulic oil is fed into the servo oil chamber of the other clutch 21 to bring it into the engaged operative position.

According to this transmission, spline element 18 and hub 16 stay coupled with each other owing to leftward movement of hub sleeve 19 during the forward movement of the vehicle, so that the first speed is established by applying clutch 6 under this condition. To change to the second speed, clutch 21 is also applied while keeping clutch 6 applied, and the third speed is obtained by applying both clutch 6 and 20. For reverse movement, clutch 6 is engaged to transmit driving power from input shaft 3 to idler gear 15 through intermediate shaft 4, so that the reverse speed is obtained when idler gear 15 and hub 16 are connected together by rightward movement of hub sleeve 19.

Figure 2:
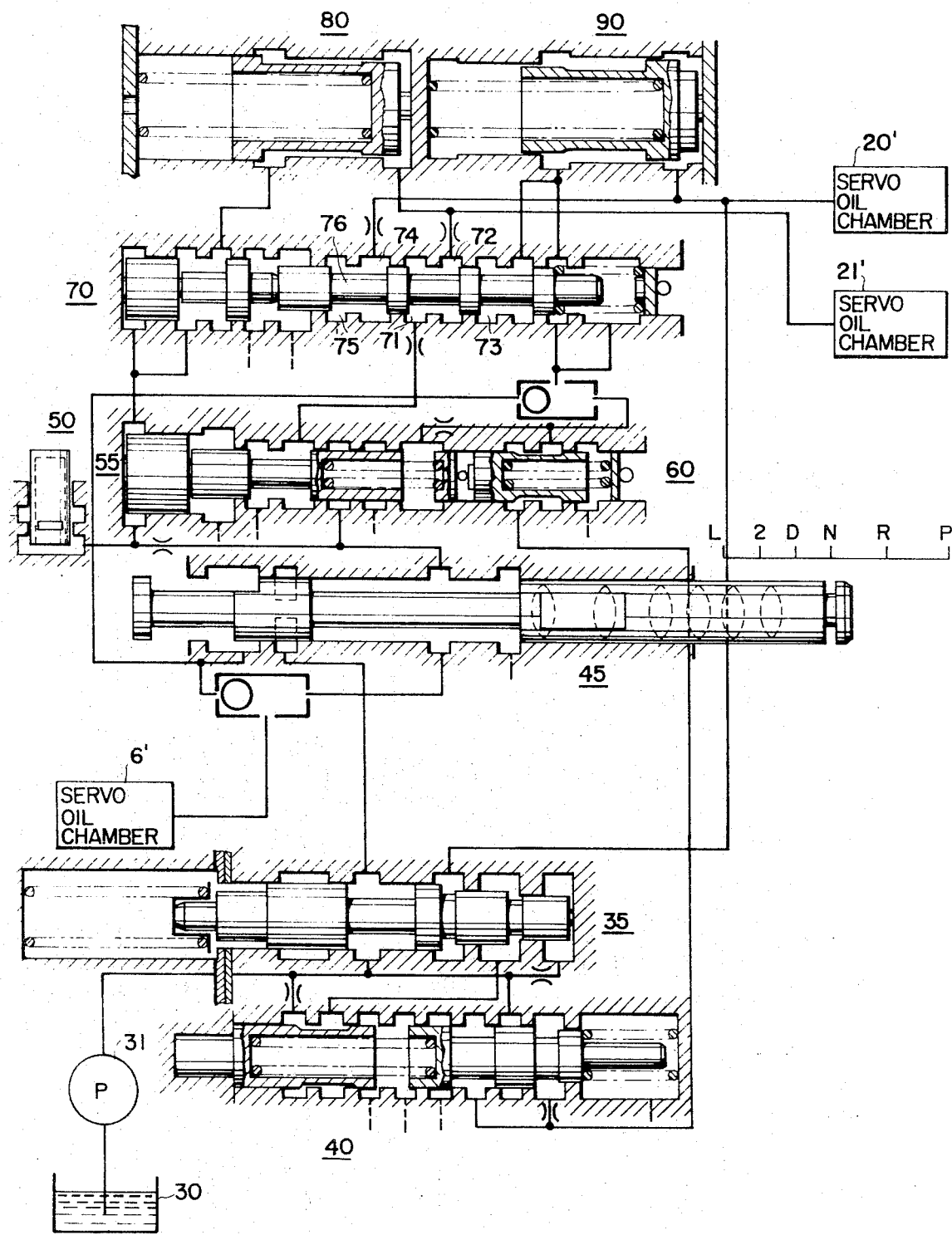
FIG. 2 is a schematic arrangement of a hydraulic circuit embodying the control circuit according to the present invention.

In this transmission, as described above, shifting of speed ranges is effected by the selective application of the three clutches 6, 20 and 21. In FIG. 2 there is shown a control circuit where such speed range shifting is performed automatically based on the vehicle speed and engine output. As will be appreciated from the figure, the control circuit consists of a servo oil chamber 6' designed to actuate the clutch 6, a servo oil chamber 20' for actuating the clutch 20, a servo oil chamber 21' for actuating said clutch 21, an oil reservoir 30, an oil pump 31, a pressure regulator valve 35, a throttle valve 40, a manual valve 45, a governor valve 50, a 1-2 shift valve 55, a throttle corrector valve 60, a 2-3 shift valve 70, a second accumulator means 80, a third accumulator means 90, and an oil passage connecting the oil passage switching means and other parts. Oil pump 31 is driven by an engine (not shown) to feed hydraulic oil from oil reservoir 30 to pressure regulator valve 35. The pressure regulator valve is in hydraulic communication with throttle valve 40 and performs pressure control such as to develop a relatively low line pressure when the opening of the engine throttle valve, which regulates the engine output, is less than a certain predetermined amount and to develop a relatively high line pressure when the opening is greater than the predetermined amount. Pressure regulator valve 35 is also in communication with the servo oil chamber 20' for third speed and functions to keep the line pressure low to prevent power loss resulting from pump loss when hydraulic oil is present in the servo oil chamber 20' and to keep the line pressure high when no hydraulic oil is present in the chamber. Throttle valve 40 is linked to an accelerator pedal (not shown) to produce a throttle pressure corresponding to the increase of the opening of engine throttle valve. Manual valve 45, which is linked to a shift lever (not shown), has six speed-range positions, namely, "L" position, "2" position, "D" position, "N" position, "R" position and "P" position, and operates to distribute a line pressure from the pressure regulator valve 35 to a required circuit in each of the positions. In the "L," "2," "D" and "R" positions, line pressure is supplied into servo oil chamber 6'. The governor valve 50 is driven by output shaft 5 of the transmission to produce a governor pressure corresponding to the vehicle speed. In "D" or "2"0 position of manual valve 45, 1-2 shift valve 55 is actuated by the difference between the throttle pressure which, corrected by throttle corrector valve 60, acts to one side and the governor pressure which acts to the other side, and when the governor pressure is increased with rise of vehicle speed so much as to exceed the sum of throttle pressure and spring force, a line pressure is supplied into second accumulator means 80 and servo oil chamber 21' for second speed through 2-3 shift valve 70.

Likewise, 2-3 shift valve 70 is actuated by the difference between the governor pressure and the sum of throttle pressure and spring force. This valve is provided with an oil chamber 71 into which line pressure is introduced, an oil chamber 72 communicated with servo oil chamber 21' for second speed, a closed oil chamber 73, an oil chamber 74 communicated with servo oil chamber 20' for third speed, a pressure-discharging oil chamber 75, and a spool 76 arranged to connect oil chamber 71 with 72 and oil chamber 74 with 75 in the second speed and to communicate oil chamber 71 with 74 and 72 with 73 in the third speed. Thus, in the second speed, spool 76 is in a state as shown in the figure, where line pressure is supplied into servo oil chamber 21' to keep clutch 21 engaged, while servo oil chamber 20' is purged of pressure to keep clutch 20 released. When shifting is effected from this second speed condition to the third speed, spool 76 is forced to move rightward to feed line pressure into servo oil chamber 20' for applying clutch 20, whereby line pressure supply to serve oil chamber 21' is shut off and the chamber is communicated with oil chamber 73 with no pressure release taking place. The second accumulator means 80 is actuated by governor pressure and changes the rate of rise of line pressure supplied to servo oil chamber 21' for second speed such that hydraulic pressure increased by supply of line pressure is reduced in reverse proportion to governor pressure. Third accumulator means 90 is actuated by throttle pressure and changes the rate of rise of line pressure supplied to servo oil chamber 20' for third speed such that hydraulic pressure increased by supply of line pressure is increased proportionally to throttle pressure.

Now, the speed change operation for obtaining second and third speeds, which is the key point of the present invention, by use of the control circuit just described will be discussed in detail. In the second speed, manual valve 45 stays at the "D" position, allowing supply of line pressure into servo oil chamber 6' to keep the associated clutch 6 engaged. During this period, line pressure is also supplied to serve oil chamber 21' by the operation of 1-2 shift valve 55 to keep clutch 21 engaged while servo oil chamber 20' is purged of pressure by the operation of 2-3 shift valve 70 to keep clutch 20 released. To effect shifting from second speed to third speed, line pressure is supplied to servo oil chamber 20' by the operation of 2-3 shift valve 70 to engage clutch 20 while clutch 21, which has been kept engaged in the second speed, is now released. In this case, however, 2-3 shift valve 70 merely acts to shut off supply of line pressure to servo oil chamber 21' and stays independent of the engaging action of clutch 20.

Figure 3:
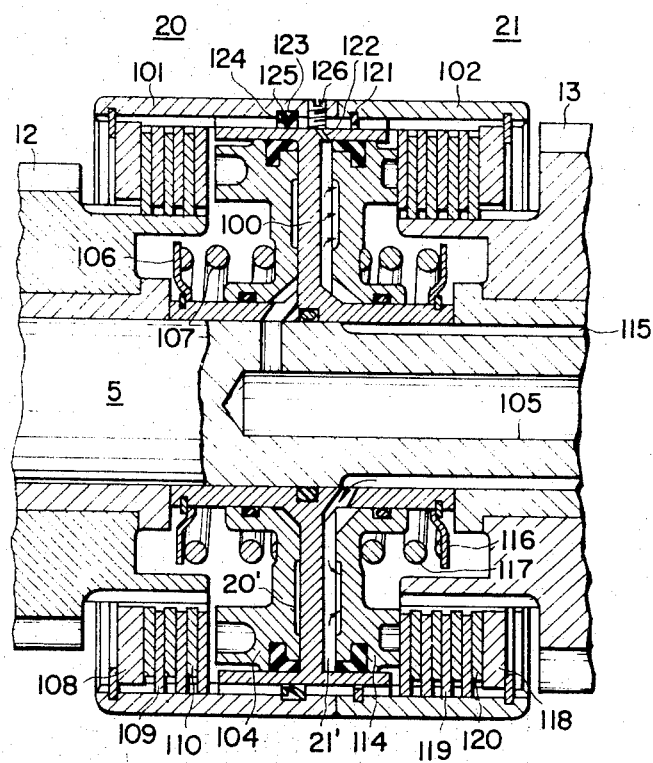
FIG. 3 is a sectional view showing an arrangement of clutch assemblies for second speed and for third speed in accordance with the present invention.

The mechanism for this operation is illustrated in FIG. 3 where the setup of clutches 20 and 21 is shown in detail on an enlarged scale. As seen in the figure, clutch 20 for third speed and clutch 21 for second speed are arranged on both sides of a partition plate 100 which is I-shaped in section and adapted to secure its boss to the output shaft 5. A disc or web of the partition plates extends radially outwardly from the boss to a rim which extends transversely of the web. A drum 101 is spline-fitted to the left side of the rim of the partition plate 100 and a piston 104 is slidably mounted between the boss and rim. Defined between the piston 104 and the disc or web of partition plate 100 is servo oil chamber 20' which is in communication with an oil hole 105 formed in the center of output shaft 5. A spring 107 is interposed between the piston 104 and a seat 106 located adjacent the piston. Drum 101 is spline-fitted with plates 109 on the same side of the piston 104 as the seat, and arranged alternately with the plates 109 are discs 110 which are spline-fitted to the hub of speed change gear 12 for third speed. The rear one of these elements abuts against a flange 108 provided integral with drum 101. Similarly, there are provided on the right side of partition plate 100, as viewed in FIG. 3, a drum 102 spline-fitted with the rim of the plate, a piston 114 slidably mounted between the rim and boss and which with the web of the plate 100 defines servo oil chamber 21' in communication with another oil hole 115 in output shaft 5, a seat 116, a spring 117, plates 119 spline-fitted with drum 102, discs 120 spline-fitted with hub of speed change gear 13 for second speed, and a flange 118.

In clutch 21 for second speed, drum 102 is coupled with partition plate 100 by means of a ring 121 and an oil exhaust port 122 in communication with the servo oil chamber 21' and drum 101 is formed in the rim of the partition plate 100. In clutch 20 for third speed, drum 101 has a groove 123 formed radially in the portion meshed with the rim of partition plate 100, and disposed in the groove 123 are a ring 124 abutting against the rim of partition plate 100 and drum 101 and a spring 125 interposed at an inclination between the ring 124 and drum 101, thereby allowing the drum 101 to move axially relative to partition plate 100 within a range corresponding to the width of groove 123. Also, at the part of drum 101 that is congruent to oil exhaust port 122 there is provided a plug 126 adapted to open or close the port 122 as occasion demands.

Thus, in second speed, oil is discharged from servo oil chamber 20' by the operation of the control circuit to let clutch 20 release to free drum 101. Therefore, drum 101 is forced to its right-side position by spring 125 to close oil exhaust port 122 with plug 126 so that line pressure supplied into servo oil chamber 21' by the control circuit is not released but acts on piston 114 to bring plates 119 and discs 120 into frictional engagement. Consequently, the speed change gear 13 is coupled with output shaft 5 through engaged plates 119 and discs 120 and through drum 102 and partition 100 to allow transmission of a drive power of a second speed gear ratio to output shaft 5. When speed range is shifted from this second speed condition to the third speed, line pressure is supplied to servo oil chamber 20' to actuate piston 104 while clutch 21 for second speed remains engaged by the control circuit. Piston 104 thus urges plates 109 and discs 110 into frictional engagement and presses flange 108 to the left, and when this pressing force overcomes the force of spring 125, drum 101 is caused to move to open oil exhaust port 122, whereby oil is discharged out of servo chamber 21' to release clutch 21. Movement of drum 101 is stopped when spring 125 assumes a substantially vertical posture and is engaged in groove 123. At this position, engagement between plates 109 and discs 110, which depends substantially on the action of piston 104, is established and a drive power having a third speed gear ratio is conveyed from speed change gear 12 to output shaft 5.

Figure 4:
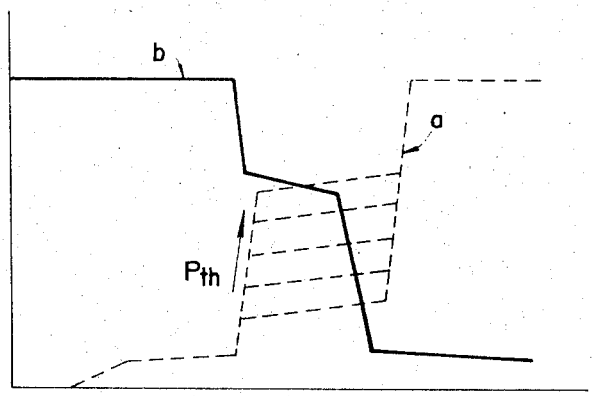
FIG. 4 is a graph showing the relationship of time to oil pressures in servo oil chambers of the engaged clutch and the disengaged clutch when shifting from second to third speed.

Shown in FIG. 4 are the hydraulic oil characteristics manifested when shifting is effected from the second speed to the third speed. As apparent from this figure, curve $a$ expresses oil pressure rise in servo oil chamber 20' to which oil is fed and curve $b$ expresses oil pressure reduction in servo oil chamber 21' from which oil is discharged and the curves overlap each other sufficiently in the early phase period, thus providing good timing between engagement and disengagement of clutches 20 and 21.

When shifting is effected from the third speed to the second speed, oil discharge from servo oil chamber 20'' is performed by the control circuit, causing piston 104 to retract under the force of spring 107 and releasing the engagement between plates 109 and discs 110. Drum 101 is also urged to move to its right position by the action of spring 125 to close oil exhaust port 122 with plug 126 so that clutch 21 for second speed alone is applied.

Thus, according to the transmission control system of the present invention, when speed range is shifted up from the second speed to the third speed, the clutch 21 for second speed is released in response to the engagement of the clutch 20 for third speed so that sufficient overlap is positively obtained to allow an optimum timing for such clutch release and engagement as compared with the conventional system where release of clutch 21 for second speed is effected by switching of 2–3 shift valve 70 in the control circuit. Therefore, it is possible to ensure a smoother and more expedient clutch releasing operation than in the case where the overlap is obtained by throttling the pressure-discharged side of servo oil chamber 21' of clutch 21, as is known. Further, since any wear of the lining is compensated by the engaging force of piston 104, no aberration of timing is caused. Moreover, there is no need to add other valve elements which will complicate the control circuit, so that the entire mechanism of the system is extremely simple.

What is claimed is:

1. A speed change control system for an automatic transmission comprising an output shaft, a first gear element selectively engageable with said output shaft, a second gear element selectively engageable with said output shaft for lower speed operation than said first gear element, at least a first friction engaging means and a second friction engaging means arranged in back-to-back relationship with one another, said first friction engaging means arranged to connect said first gear element to said output shaft, said second friction engaging means arranged to connect said second gear element to said output shaft, said first friction engaging means including a first servo oil chamber, said second friction engaging means including a second servo oil chamber, said first and second friction engaging means having at least one common member, control circuit means for supplying hydraulic oil to and for discharging hydraulic oil from said first servo oil chamber and said second servo chamber for providing a higher speed range by engaging said first friction engaging means for connecting said first gear element to said output shaft and by releasing said second friction engaging means for disconnecting said second gear element from said output shaft and for providing the lower speed range by engaging said second friction engaging means for connecting said second gear element to said output shaft and by releasing said first friction engaging means for disconnecting said first gear element from said output shaft, and said control circuit means including means associated with said first friction engaging means and said common member maintaining hydraulic oil pressure in said second servo oil chamber after hydraulic oil has been supplied to said first servo oil chamber and for effecting relative movement between said common member and a part of said friction engaging means for releasing oil from said second servo oil chamber so that said second friction engagement means are released after a predetermined progress has been achieved in the engagement of said first friction engaging means.

2. A speed change control system, as set forth in claim 1, wherein said common member comprises a partition plate secured on said output shaft, said partition plate extends transversely of and outwardly from said output shaft, said first friction engaging means comprises a drum encircling said output shaft and spline-fitted to said partition plate, said drum disposed in radially spaced relationship to said output shaft, an assembly of alternating plates and discs extending transversely of said output shaft and arranged in juxtaposed relationship to one another, one of the plates and the discs is fixed to said drum and the other one is fixed to said first gear element, a piston assembly associated with said partition plate and having a surface disposed in juxtaposed relationship with said partition plate and defining therebetween said first servo oil chamber, said piston assembly is axially displaceable on said shaft into contact with said assembly of plates and discs, means for connecting said control circuit means to said first servo chamber for supplying hydraulic pressure thereto, the surface of said drum in engagement with said partition plate having a groove therein, said means associated with said first friction engaging means and said common member comprises spring means disposed within said groove for axially displacing said drum relative to said partition plate when a predetermined value is reached as hydraulic pressure within said first servo oil chamber displaces said piston assembly against said assembly of plates and discs, and a plug fitted in and extending through said drum in contact with said partition plate, said second friction engaging means positioned adjacent said partition plate and extending therefrom on said output shaft on the opposite side of said partition plate from said first friction engaging means, said second friction engaging means including a piston assembly associated with said partition plate and having a surface disposed in juxtaposed relationship with said partition plate and defining therebetween said second servo oil chamber, said second friction engaging means having an oil discharge port in communication with said second servo oil chamber, said plug arranged to close said oil discharge port when said first friction engaging means is in the released state for closing said second servo oil chamber and for opening said discharge port when said first engaging means is in the engaged state with said output shaft or discharging oil pressure from said second servo oil chamber, and said control circuit means including a shift valve arranged for shifting from operation by said second gear element to operation by said first gear element for guiding the flow of hydraulic oil into said first servo chamber and for shutting off the flow of hydraulic oil into said second oil chamber while said second friction engaging means remains engaged.

3. A speed change control system, as set forth in claim 2, wherein said second friction engaging means comprises a second drum secured to said partition portion plates and encircling said output shaft, said second drum extending in the axial direction of said output shaft on the opposite side of said partition plate from said first engaging means, and a second assembly of alternating plates and discs extending transversely of said shaft and arranged in juxtaposed relationship, one of the plates and discs is fixed to said second drum and the other one is fixed to said second gear element.

4. A speed change control system, as set forth in claim 2 wherein in a plane extending radially through said shaft said partition plate has an I-shaped cross-section, said partition plate comprising a radially inner boss positioned on said output shaft, a radially outwardly extending web, and a rim secured to and extending transversely of the radially outer end of said rim.

5. A speed change control system, as set forth in claim 4, wherein said piston assembly comprises a piston member disposed in juxtaposed relationship to said partition plate and extending between said boss and said rim of said partition plate, an annular seat member secured to the outer surface of said boss of said partition plate and spaced axially from said web of said partition plate, and a spring positioned between said seat and the adjacent surface of said piston member for biasing said piston member into contact with said web of said partition plate.

* * * * *